United States Patent [19]

Fukunaga et al.

[11] Patent Number: 5,040,379
[45] Date of Patent: Aug. 20, 1991

[54] TEMPERATURE CONTROLLER OF LIQUID COOLING SYSTEM

[75] Inventors: Osamu Fukunaga; Shozo Tsuda, both of Settsu, Japan

[73] Assignee: Daikin Industries, Ltd., Osaka, Japan

[21] Appl. No.: 370,744

[22] Filed: Jun. 20, 1989

[30] Foreign Application Priority Data

Jun. 21, 1988 [JP] Japan .................................. 63-153004
Jun. 21, 1988 [JP] Japan .................................. 63-153005
Sep. 21, 1988 [JP] Japan .................................. 63-236895
Sep. 21, 1988 [JP] Japan .................................. 63-236896

[51] Int. Cl.$^5$ .......................................... F25D 17/02
[52] U.S. Cl. ........................................ 62/201; 62/209; 62/228.4
[58] Field of Search ..................... 62/201, 228.4, 228.5, 62/226, 215, 185, 203, 208, 209, 278.1

[56] References Cited

U.S. PATENT DOCUMENTS

| | | | |
|---|---|---|---|
| 2,620,635 | 12/1952 | Mautner et al. | 62/185 X |
| 4,262,491 | 4/1981 | Chorey et al. | 62/201 X |
| 4,270,361 | 6/1981 | La Barge | 62/201 X |
| 4,608,833 | 9/1986 | Kountz | 62/201 X |

Primary Examiner—Harry B. Tanner
Attorney, Agent, or Firm—Wenderoth, Lind & Ponack

[57] ABSTRACT

A temperature controller is provided for controlling a coolant temperature in a liquid coolant system including a liquid circulation circuit, in which coolant for cooling a machine circulates, and a refrigeration circuit for cooling the coolant. The operating capacity of a compressor of the refrigeration circuit is variably adjusted by an inverter, and when the operating condition of the machine is changed, the frequency value for driving the compressor is varied in accordance with the change. Accordingly, it is possible to immediately correspond to the change of a liquid temperature to be generated in the future. In addition, an appropriate control mode can be selected as a control for varying the frequency in combination with a normal feedback control, such that the liquid temperature may converge on a set value or may be co-changed to a room temperature.

12 Claims, 13 Drawing Sheets

FIG. 2
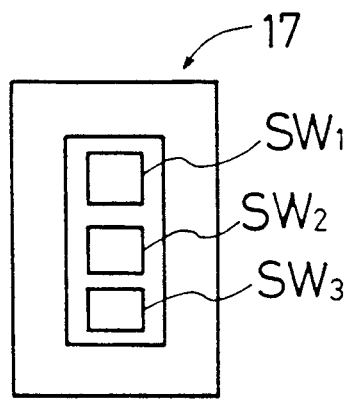
FIG. 3
| TEMPERATURE RANGE | ZONE | CHANGE OF FREQUENCY |
|---|---|---|
| Ts +1.5°c | 3-U | +30Hz |
| Ts +1.0°c | 2-U | +20Hz |
| Ts +0.5°c | 1-U | +10Hz |
| Ts | 0-U | 0 |
| | 0-L | 0 |
| Ts -0.5°c | 1-L | -10Hz |
| Ts -1.0°c | 2-L | -20Hz |
| Ts -1.5°c | 3-L | -30Hz |
| Ts -2.0°c | 4-L | -40Hz |
| Ts -2.5°c | 5-L | -50Hz |
FIG. 4
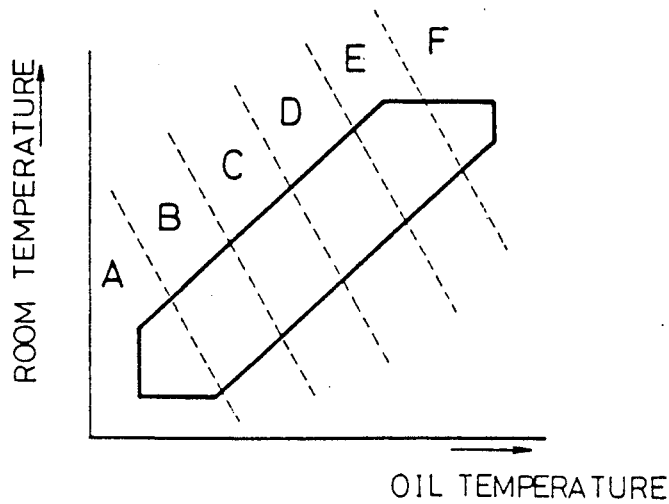

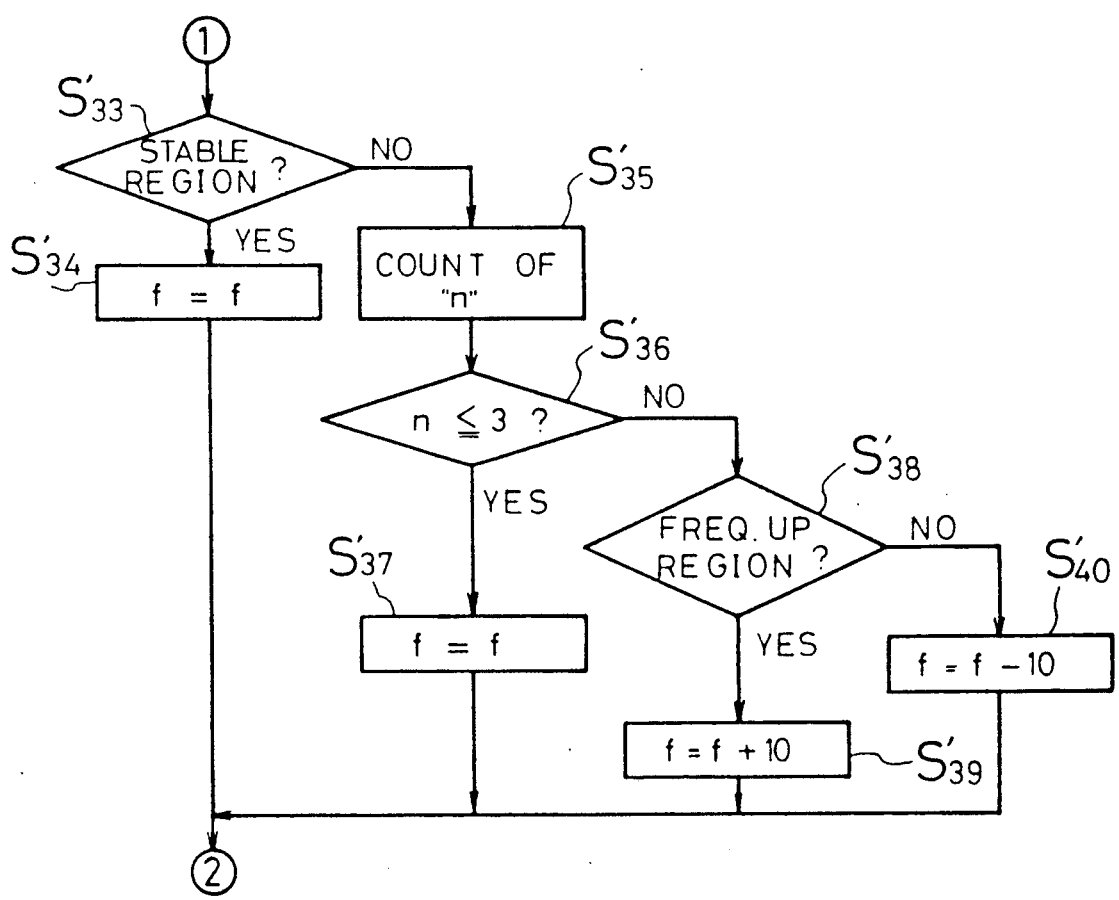

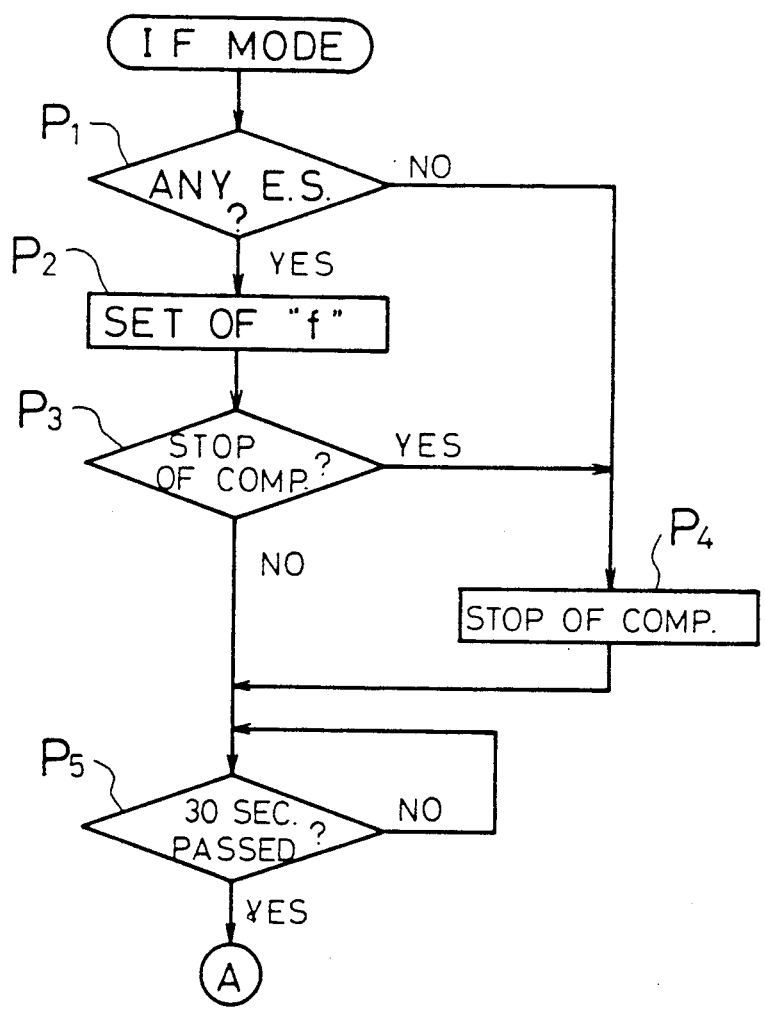

TEMPERATURE CONTROLLER OF LIQUID COOLING SYSTEM

BACKGROUND OF THE INVENTION

1. Field of the Invention

The present invention relates to a temperature controller of a liquid cooling system for maintaining the temperature of coolant in a machine, such as a machine tool, at a predetermined value using a refrigeration circuit and, more particularly, to an improvement in a control precision of the coolant temperature in consideration of the change of an operating condition, or a parameter relevant to the quantity of heat generated in a machine.

2. Description of a Prior Art

Conventionally, as a temperature controller of a liquid cooling system for controlling a coolant temperature in a machine, such as a machine tool, at a predetermined value, a system has been well known in which coolant is cooled using a refrigeration circuit to hold the coolant temperature constant.

For example, as disclosed by the Japanese Utility Model Publication Gazette No. 48-27351, a temperature grade around a machine such as a machine tool is held constant in the course of operation and the heat strain of each part of the machine is restrained to the extent possible by measuring the temperature of cooling oil in the machine and the temperature of the machine, and feedback-controlling the temperature difference between the cooling oil temperature and the machine temperature to maintain it at a previously set value.

In addition, as disclosed by the Japanese Patent Publication Gazette No. 46-16216, it is known that the same effect as mentioned above can also be obtained by maintaining the temperature difference between the cooling oil temperature and the room temperature at a predetermined set value.

In both cases, in order to maintain the temperature difference at a set value, a compressor in a refrigeration circuit is turned ON and OFF in accordance with the difference between the temperature difference and the target set value for control. More specifically, as shown in FIG. 12, when the temperature difference reaches the set value from the high temperature side, the compressor is stopped (a1, a2, ...). On the other hand, when the temperature difference rises from the set value by a certain quantity, the compressor starts its operation (b1, b2, ...). Therefore, the cooling oil temperature changes considerably in accordance with the change of ON and OFF of the compressor as shown by a solid line in FIG. 12 and the change of the machine temperature in accordance with the above-mentioned change is delayed, so that the hunting of the control could be generated.

As disclosed by the Japanese Patent Laying Open Gazette No. 60-131149 or the Japanese Patent Laying Open Gazette No. 60-133273, it is considered that the change of the coolant temperature is smoothed and a temperature control precision of a machine can be improved by adjusting the operating capacity of a compressor in a refrigeration circuit having an inverter with a variable frequency.

However, when the operating condition of the machine changes, for example, when the rotation frequency of a main shaft of the machine tool increases while the coolant temperature is feedback-controlled, it takes considerable time until the machine temperature, that is, the coolant temperature changes by the above-mentioned change. As a result, hunting due to the response delay of the control could be generated for example, so that there is the possibility that a stable control can not be performed.

SUMMARY OF THE INVENTION

A main object of the present invention is to improve a temperature control precision to promptly correspond to the change of the coolant temperature that will happen in the future to prevent hunting by detecting an operating condition of a machine and, when the operating condition of the machine changes which could influence on the coolant temperature, previously adjusting an operating frequency of a compressor in accordance with the change.

In order to attain the above object, a controller of a liquid cooling system, having a liquid circulation circuit through which coolant of a machine circulates and a refrigeration circuit for cooling the coolant in the liquid circulation circuit, includes an inverter for variably adjusting an operating frequency of a compressor, means for detecting an operating condition as a parameter relevant to the quantity of heat generated in the machine, and means, connected to the means for detecting the operating condition, for varying the frequency of the inverter in accordance with the operating condition of the machine.

As the above-described means for detecting the operating condition of the machine, there is a temperature sensor for detecting the temperature of an operating part in the machine, a sensor for detecting the mechanical strain of the operating part, a sensor for detecting a load (for example, a current) of an actuator (for example, a motor) of the machine, and a sensor for detecting the rotation frequency of a main shaft in case where the machine is a machine tool and the like.

Another object of the present invention is to perform a stable control without any control delay for the change of the operating condition which could cause a delay because of the inability of the feedback control to follow, by changing the operating frequency of the compressor from a control value in accordance with the feedback control by a quantity corresponding to the change of the operating condition only when there is a change of the operating condition of the machine which influences on the coolant temperature, while performing the conventional feedback control.

In order to attain the above object, the temperature controller of the liquid cooling system further includes means, connected to means for detecting a liquid temperature, for feedback-controlling an output frequency of an inverter such that the coolant temperature may converge on a predetermined set value and means, connected to the means for detecting the operating condition of the machine, for varying the frequency of the inverter from the frequency value controlled by the feedback-controlling means by a quantity corresponding to the change of the operating condition when the change of the operating condition of the machine is above a predetermined value.

In addition, further includes is means for detecting the temperature of a co-changing object to which the temperature of the coolant is co-changed, means for feedback-controlling the temperature difference between the coolant temperature and the co-changing temperature as described above, and means for varying the frequency of the inverter when the change of the operating condition of the machine is above the predetermined value.

A further object of the present invention is to control the coolant temperature in an optimum control mode corresponding to an installation condition of the machine and the like, by setting a control mode by a feedback control, a control mode by the change of the frequency of the compressor in accordance with the change of the operating condition and a control mode switching both modes in accordance with the operating condition of the machine, in accordance with an external signal and selecting its operating mode in accordance with the external signal.

In order to attain the above objects, the temperature controller of the liquid cooling system includes means for alternately selecting the control mode of the frequency of the inverter among a control mode by only means for feedback-controlling the liquid temperature, a control mode switching to the control varying the frequency of the inverter from the frequency value by the feedback controlling means when the change of the operating condition of the machine is above the predetermined value while performing the control by the feedback controlling means, and a control mode by only means for varying the frequency of the inverter, in accordance with the external command signal.

In addition, when the feedback control is performed on the temperature difference between the liquid temperature and the co-changing object temperature, there is also provided the same means for selecting the above three control modes.

Still another object of the present invention is to prevent the trouble of the compressor due to the frequent ON . OFF repetition of the compressor and to improve its reliablitity, by stopping the compressor not immediately after a signal for stopping the operation of the compressor is output but after the change of the coolant temperature and the like has been observed for a while and then there is still an operation stoppage command of the compressor during the above control.

In order to attain the above object, the temperature controller of the liquid cooling system stops the compressor only after a stoppage command signal has been output for a predetermined time or a predetermined number of times, even when the liquid temperature or the temperature difference between the liquid temperature and the co-changing object temperature approaches a set value and a command to stop the compressor is output.

BRIEF DESCRIPTION OF THE DRAWINGS

The nature and advantage of the present invention will be made more apparent from the following description made with reference to the accompanying drawings, in which:

FIG. 2 is a front view of a switch panel;

FIG. 3 is a view showing temperature zones of a multistage step control;

FIG. 4 is a capacity map showing the relation between an inverter frequency and an inlet oil temperature and a room temperature at the time of a starting control;

FIGS. 7a, 7b and 7c are flowcharts showing control contents of an FB mode operation;

FIG. 8 is a flowchart showing control contents of an IF mode;

DESCRIPTION OF PREFERRED EMBODIMENTS

Embodiments of the present invention will be explained below with reference to the accompanying drawings.

Figure 1:
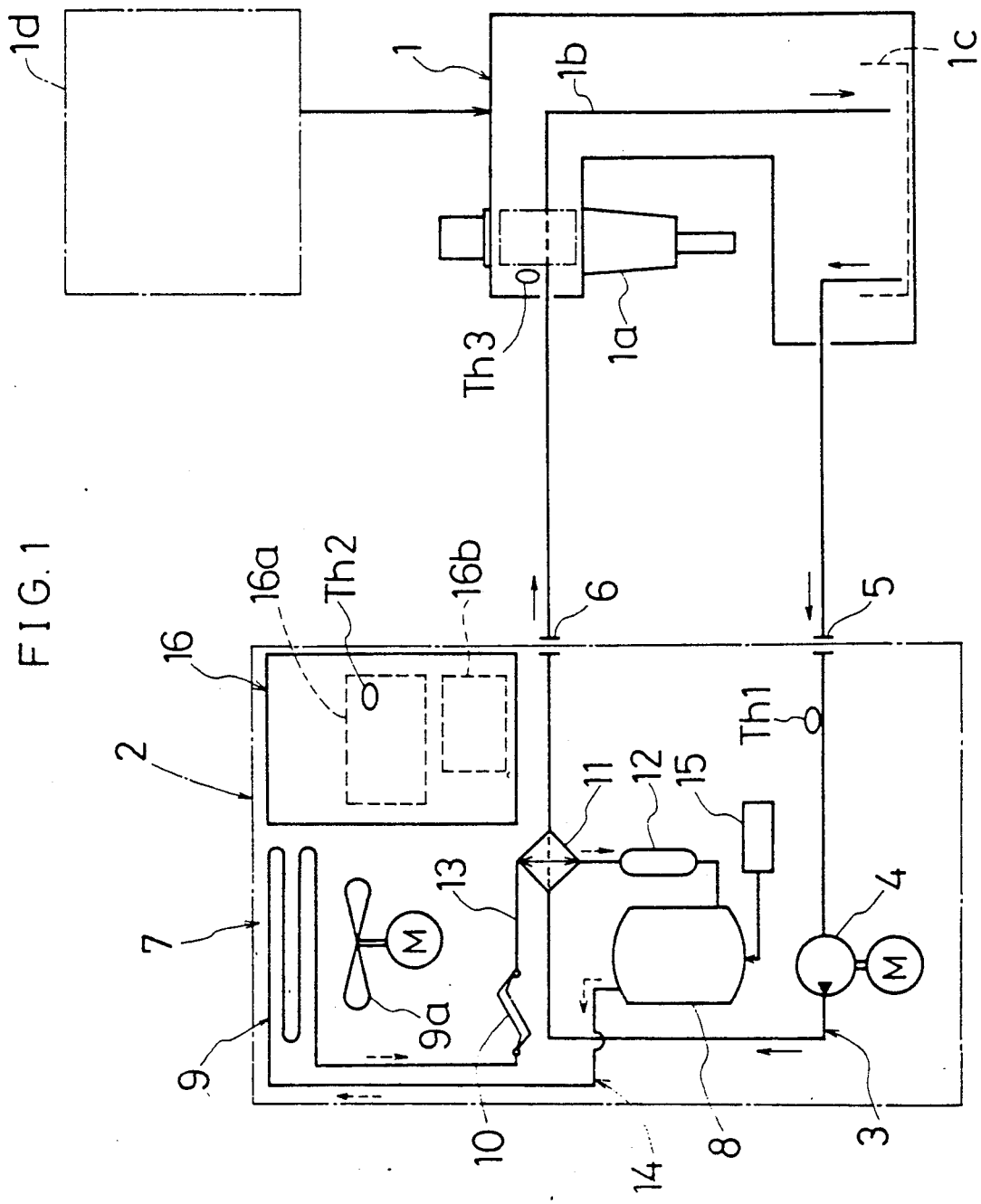
FIG. 1 is a block diagram, schematically showing a system as a whole.

In FIG. 1, reference numeral 1 designates a machine tool for performing a predetermined machine work and reference numeral 2 designates an oil conditioner operating as a liquid cooling system for cooling cooling oil in the machine tool. The machine tool 1 comprises a main shaft 1a for mounting a cutting tool such as a milling cutter and a drill edge on a tip, an oil tube 1b for circulating the cooling oil which absorbs heat Q generated in the main shaft 1a with the machine work and the like to keep the temperature constant and a reservoir 1c for receiving the cooling oil. In addition, the above-mentioned oil conditioner 2 is connected to the machine tool 1 by the oil tube 1b such that oil may flow and includes a built-in oil circulation circuit 3 operating as a liquid circulation circuit for circulating the cooling oil. A fixed delivery pump 4, driven for rotation by a motor M, for forcedly circulating the cooling oil is provided in the oil circulation circuit 3 in which the oil returned from the reservoir 1c of the machine tool 1 flows in through an inlet port 5 and flows out of an outlet port 6 toward the oil tube 1b of the machine tool 1.

On the other hand, a refrigeration unit 7 is included in the oil conditioner 2. The refrigeration unit 7 includes a compressor 8, a fan 9a, condenser 9 for condensing refrigerant, a capillary 10 operating as a reducing valve for decompressing the refrigerant, an evaporator 11 for evaporating the refrigerant to cool the cooling oil in the oil circulation circuit 3 by heat exchange with the refrigerant, and an accumulator 12 for isolating gas and liquid in the refrigerant which returns to the compressor 8. Those components 8 through 12 are connected by a refrigerant tube 13 such that the refrigerant can flow and a refrigeration circuit 14 is provided for performing the so-called heat pump operation in which the cold obtained from the heat exchange with air in the condenser 9 is applied to the cooling oil of the oil circulation circuit 3 in the evaporator 11. More specifically, in the oil circulation circuit 3, the cooling oil whose temperature rose because it absorbed the heat Q at the main shaft 1a of the machine tool 1 is cooled in the evaporator 11 and then supplied to the machine tool 1 again, so that the temperature at the main shaft 1a of the machine tool 1 can be kept constant to control a dimensional change due to its temperature change to obtain a predetermined machining precision.

As shown in the following table 1, reference numeral 15 is an inverter which variably adjusts and drives an operating frequency fn of the compressor 8 among 11 steps in total of n=0 (stop), n=1 (30 Hz), n=2 (40 Hz), n=3 (50 Hz), n=4 (60 Hz), ..., and n=10 (120 Hz).

Reference numeral 16 is a controller for controlling the operation of the whole system. The controller 16 includes a main circuit 16a for controlling the oil conditioner and an interface circuit 16b inputting a predetermined external signal in accordance with the operating condition of the machine 1 and outputting it to the main circuit 16a. Both circuits 16a and 16b are connected by a signal line. Reference numeral Th1 represents an inlet oil thermistor mounted on the inlet side of the oil circulation circuit 3 in the oil conditioner 2, that is, an oil inlet joint of the pump 4 operating as liquid temperature detector for detecting the temperature of the coolant returning from the machine tool 1 to the oil conditioner 2, reference numeral Th2 represents a room temperature thermistor mounted on a panel of the controller 16 in the oil conditioner 2 for detecting a room temperature $T_A$ of a co-changing object to which the temperature of the cooling oil is to be co-changed, and reference numeral Th3 represents a main shaft thermistor mounted on the main shaft 1a of the machine tool 1 operating as operating condition detector for detecting a main shaft temperature H corresponding to the operating condition of the machine tool (machine).

TABLE 1

| step n | frequency fn (Hz) |
| --- | --- |
| 0 | 0 |
| 1 | 30 |
| 2 | 40 |
| 3 | 50 |
| 4 | 60 |
| 5 | 70 |
| 6 | 80 |
| 7 | 90 |
| 8 | 100 |
| 9 | 110 |
| 10 | 120 |

The controller 16 is connected directly to the inlet oil thermistor Th1, the room temperature thermistor Th2 and the inverter 15 and indirectly to the main shaft thermistor Th3 through a control unit 1d on the machine tool 1 side, to be described later, such that a signal can be input and output and the operation of the oil conditioner controlled by the controller 16.

On the other hand, the control unit 1d for controlling the operation of the machine tool 1 can apply and receive a signal to and from the controller 16 and an external signal such as ON . OF of the main shaft 1a of the machine tool 1 can be input to the controller 16. The main shaft thermistor Th3 disposed on the main shaft 1a of the machine tool 1 is connected to the control circuit 1d such that a signal can be input.

As a feature of the present invention, mode switches SW1 through SW3 for commanding three operation modes are mounted on a switch panel 17 of the controller 16 as shown in FIG. 2. The mode switches SW1 through SW3 correspond to an FB mode for performing only a feedback control of the frequency of an inverter 15 in accordance with the signal of two thermistors Th1 and Th2, an FF mode for performing the feedback control of the frequency in accordance with the signal of two thermistors Th1 and Th2, while switching to the control which changes the frequency in accordance with the main shaft temperature H when the change of the main shaft temperature H representing the operating condition of the machine tool (machine) 1 detected by the main shaft thermistor Th3 is a predetermined value or more, and an IF mode for changing the frequency in accordance with the signal of only the main shaft thermistor Th3, respectively. More specifically, the mode switches SW1 though SW3 function as a control mode selector for selecting the control mode of the frequency of the inverter 15 among the control mode (FB mode) performing only the feedback control, the control mode (FF mode) performing the feedback control, while switching to the control which changes the output frequency of the inverter 15 from the frequency value in the feedback control when the change of the operating condition of the machine 1 detected by the main shaft thermistor Th3 becomes a predetermined value or more.

As shown in FIG. 3, referring to the temperature difference $\Delta T$ ($=T_O-T_A$) between an inlet oil temperature $T_O$ and a room temperature $T_A$ detected by the inlet oil temperature thermistor Th1 and the room temperature respectively, multistage temperature zones are set at intervals of 0.5° C. about a predetermined set value Ts of its control target value in a memory unit (not shown) built in the controller 16. The region of change is divided into 10 multistage steps in total which are arranged in the order of a temperature zone (3−U) within the range of $\Delta T>Ts+1.5°$ C., a temperature zone (2−U) within the range of $Ts+1.5°$ C.$\geq\Delta T>Ts+1.0°$ C., a temperature zone (1−U) within the range of $Ts+1.0°$ C.$\geq\Delta T>Ts+0.5°$ C., a temperature zone (0−U) within the range of $Ts+0.5°$ C.$\geq\Delta T>Ts$, a temperature zone (0−L) within the range of 0° C.$\geq\Delta T>Ts-0.5°$ C., a temperature zone (1−L) within the range of $Ts-0.5°$ C.$\geq\Delta T>Ts-1.0°$ C., and so forth until a temperature zone (5−L) within the range of $\Delta T\leq Ts-2.0°$ C. More specifically, the frequency value f of the inverter 15 is feedback-controlled depending in which temperature zone the temperature difference $\Delta T$ between the inlet oil temperature $T_O$ and the air temperature $T_A$ detected by the inlet oil thermister Th1 and the room temperature thermister Th2 exists.

In an individual input connector (not shown) having the allocation function of an eight-bit I/O signal in the interface circuit 16b, a six-bit signal arranged at addresses (2) through (7) thereof is used for control as shown in the following table 2. The two-bit signal arranged at the first two addresses [2] and [3] corresponds to a signal for switching the mode switches SW1 through SW3, in which the FB mode, the FF mode and the IF mode are selected at addresses (00), (01) and (10), respectively. The four-bit signal arranged at the addresses [4] through [7] is an external command signal (E.S.) classified by the types of the above-selected control modes and corresponding to a change value dH/dt of the main shaft temperature H detected by the main shaft thermistor Th3.

In addition, a mark — means that it functions regardless of its value of 0 or 1 .

More specifically, in the FB mode, a control command signal is (- - - -) which means that the feedback control in accordance with the inlet oil thermistor Th1 and the room temperature thermistor Th2 is performed regardless of the signal from the interface circuit 16b, that is, regardless of the signal of the main shaft thermistor Th3.

In the FF mode, the present frequency fn of the inverter 15 controlled by the feedback control may be maintained as it is, that is, the feedback-control is performed only when the external command signal value is (0 0 0 0) (no external signal), which corresponds to a case in which there is almost no value of the main shaft temperature change dH/dt.

TABLE 2

| mode | | external command | | | | command content |
|---|---|---|---|---|---|---|
| 2 | 3 | 4 | 5 | 6 | 7 | |
| 0 | 0 | — | — | — | — | operation by FB mode |
| 0 | 1 | 0 | 0 | 0 | 0 | frequency is controlled by FB mode |
| | | — | 1 | — | 1 | compressor is stopped |
| | | 0 | 0 | 0 | 1 | 2 steps down |
| | | 0 | 0 | 1 | 0 | 3 steps down |
| | | 0 | 0 | 1 | 1 | 4 steps down |
| | | 0 | 1 | 0 | 0 | 2 steps up |
| | | 1 | 0 | 0 | 0 | 3 steps up |
| | | 1 | 1 | 0 | 0 | 4 steps up |
| 1 | 0 | 1 | 1 | 1 | 1 | compressor is stopped |
| | | 0 | 0 | 0 | 0 | present frequency is maintained |
| | | 0 | 0 | 0 | 1 | n = 1 |
| | | 0 | 0 | 1 | 0 | n = 2 |
| | | 0 | 0 | 1 | 1 | n = 3 |
| | | 0 | 1 | 0 | 0 | n = 4 |
| | | 0 | 1 | 0 | 1 | n = 5 |
| | | 0 | 1 | 1 | 0 | n = 6 |
| | | 0 | 1 | 1 | 1 | n = 7 |
| | | 1 | 0 | 0 | 0 | n = 8 |
| | | 1 | 0 | 0 | 1 | n = 9 |
| | | 1 | 0 | 1 | 0 | n = 10 |

In addition, when the external command signal value is (−1 −1), which corresponds to a case in which the main shaft change−dH/dt is a predetermined value or more (when excessively cooled), the compressor 1 is stopped. On the other hand, when the external command signal value is (0 0 0 1) through (1 1 0 0), the inverter frequency fn controlled by the feedback control is increased or decreased by predetermined steps. More specifically, when the value is (0 0 0 1), corresponding to the case where $dH/dt = -\Delta H_0$ (for example, approximately $\Delta H_0 = 0.2°$ C./sec), the frequency is decreased by 2 steps and when the value is (0 0 1 0), corresponding to the case where $dH/dt = -2\Delta H_0$, the frequency is decreased by 3 steps. When the value is (0 0 1 1), corresponding to the case where $dH/dt = -3\Delta H_0$, the frequency is decreased by 4 steps and when the value is (0 1 0 0), corresponding to the case where $dH/dt = \Delta H_0$, it is increased by 2 steps. In addition, when the value is (1 0 0 0), corresponding to the case where $dH/dt = 2\Delta H_0$, it is increased by 3 steps and when the value is (1 1 0 0), corresponding to the case where $dH/dt = 3\Delta H_0$, it is increased by 4 steps.

On the other hand, in the IF mode, when the external command signal value is (1 1 1 1), corresponding to the case where the main shaft temperature H is lower than a predetermined value, the compressor 1 is stopped and when the value is (0 0 0 0), corresponding to the case where there is almost no change dH/dt of the main shaft temperature H, the present frequency value fn is maintained as it is. When the value is (0 0 0 1) through (1 0 1 0), corresponding to the case where the main shaft temperature H is in temperature zones divided into 10 zones at the intervals of 0.5° C. in the vicinity of a predetermined standard temperature, the inverter frequency value fn corresponds to a value in a steps of n=1 through 11 shown in the above table 1.

Figure 5:
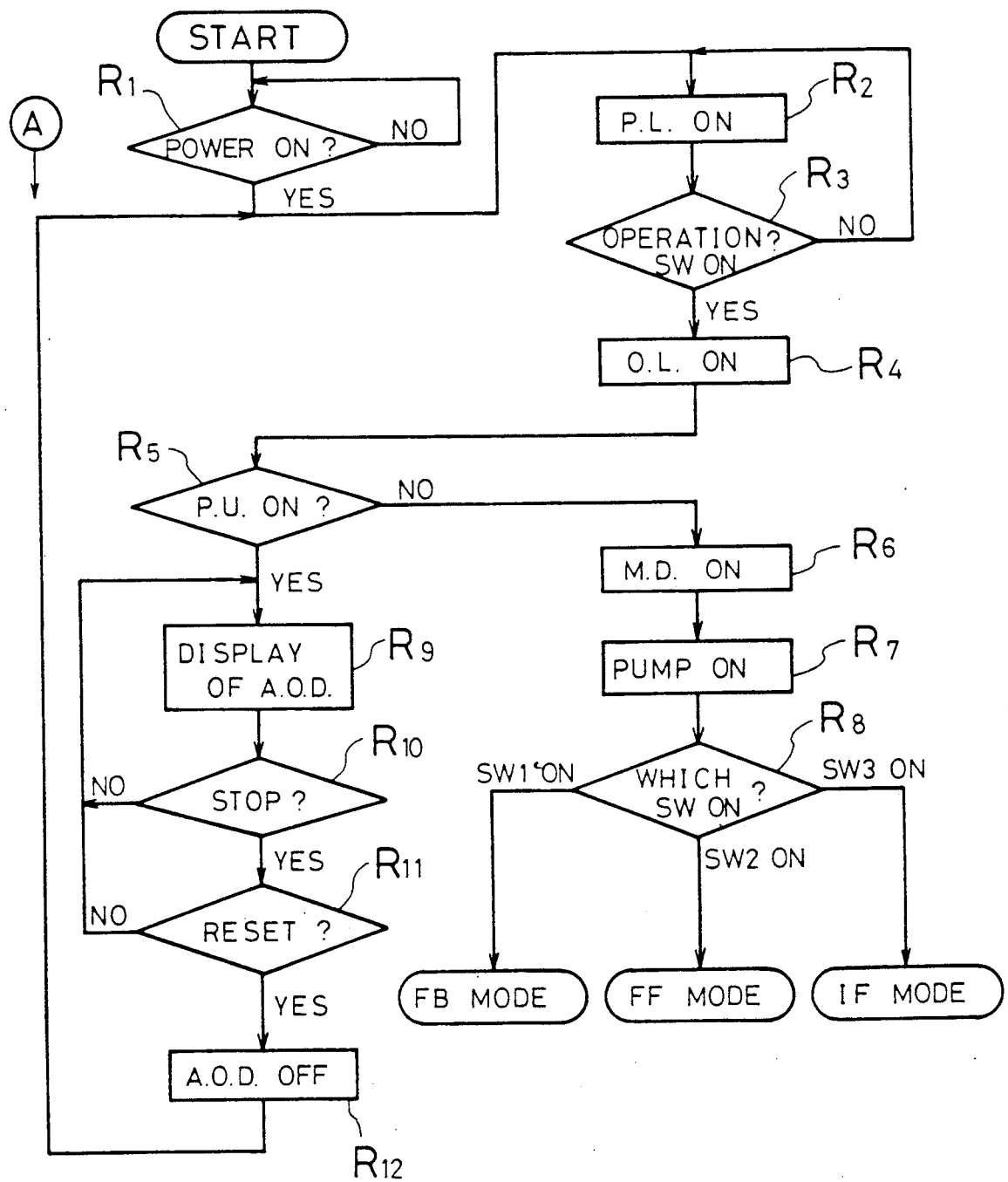
FIG. 5 is a flowchart showing control contents when the system starts.

A description is given of control contents thereof in accordance with the flowcharts shown in FIG. 5 through FIG. 7c. In FIG. 5, when the operation of an oil conditioner starts, a power lamp (P.L.) turns on at a step $R_2$ after a step $R_1$ and when a main switch (not shown) for operation turns on at a step $R_3$, an operation lamp (O.L.) turns on at a step $R_4$. Then, it is determined whether or not a protection unit (P.U.) (not shown) is normal at a step $R_5$, and when it is normal, a monitor display (M.D.) is turned on at a step $R_6$ and a pump 4 for circulating oil is turned on at a step $R_7$ and then a connection condition of the mode switches SW1 through SW3 is determined at a step $R_8$. When the mode switch SW1 is on, the FB mode operation starts and when the mode switch SW2 is on, the FF mode operation starts and when the mode switch SW3 is on, the IF mode operation starts. When it is determined that the protection unit is not in the normal condition at the step $R_5$, an abnormal output is displayed (A. O. D.) at step $R_9$ and the operation of the system is stopped and reset at steps $R_{10}$ and $R_{11}$. Thereafter, the abnormal output display (A. O. D.) is turned off and then the operation flow returns to the step $R_2$ again.

Since the FB mode operation is comprised in the FF mode operation, it will be described later. First, a description is given of the FF mode operation in reference to FIGS. 6a, 6b and 6c.

When the oil conditioner starts its operation, the inlet oil temperature $T_O$ and the room temperature $T_A$ detected by the inlet oil thermistor Th1 and the room temperature thermistor Th2 are input at a step $S_1$ and from those values, it is calculated that, in which area of A through F in a capacity map of the compressor 8 shown in FIG. 4, necessary capacity exists. Then, it is determined whether or not it corresponds to each area of A through F in the capacity map in order in steps $S_2$ through $S_6$ and the output frequency f of the inverter 15 is set at 100 Hz, 80 Hz, . . . , 30 Hz in accordance with the area A through F from that result.

Then, the temperature difference $\Delta T$ ($=T_O-T_A$) between the inlet oil temperature $T_O$ and the room temperature $T_A$ is calculated at a step $S_{13}$. It is determined that in which zone among the temperature zones (3−U) through (5−L) the calculated value exists at steps $S_{14}$ through $S_{22}$ and the output frequency f of the inverter 15 is increased or decreased by +30 Hz, +20 Hz, . . . , −40 Hz and −50 Hz from the present frequency value corresponding to the temperature zones (3−U) through (5−L) at steps $S_{23}$ through $S_{32}$. The value of the output frequency f is maintained as it is at the temperature zones (0−U) and (0−L).

When the multistage step control is completed as described above, it is determined whether or not the control condition is in a stable region. More specifically, it is determined whether or not the temperature difference $\Delta T$ between the inlet oil temperature $T_O$ and the room temperature $T_A$ is in a temperature zone (0−U) or (0−L) of the stable region at steps $S_X$. When it is in the stable region, the output frequency f of the inverter 15 is reset at the present frequency at a step $S_{34}$, but when it is not in the stable region, the number of times n this step has been performed is counted at a step $S_{35}$ and it is determined whether or not the number of times n is below 3 at step $S_{36}$. When the number of times n is 3 or less, it is determined that sufficient time has not yet passed to change the operating condition and the output frequency f of the inverter 15 is maintained as it is at a step $S_{37}$. On the other hand, when the number of times n is more than 3, it is determined whether or not the change of the temperature difference $\Delta T$ is on the increased side of the frequency change at a step $S_{38}$. When it is on the increased side, it is reset such that $f = f + 10$ Hz at a step $S_{39}$ and when on the decreased side, it is reset such that $f = f - 10$ Hz at a step $S_{40}$. More specifically, even if the temperature difference $\Delta T$ between the inlet oil temperature $T_O$ and the room temperature $T_A$ change with the change of the operating condition and it is not in the temperature zones (0−U) and (0−L) of the stable region, the output frequency f of the inverter 15, that is, the operating frequency of the compressor 8 is not immediately changed and the temperature difference $\Delta T$ is not brought close to the temperature zones (0−U) and (0−L) by changing the frequency f until it is not in the stable region three times in succession.

As described above, when the stable region control is completed, it is determined whether or not the external signal (E. S.), that is, the information from the main shaft thermistor Th3 is input on the side of the machine tool 1 at a step $S_{41}$. When it is not input, then a next control will be performed. On the other hand, when the external signal is input, the information contents of the input signal is processed at a step $S_{42}$ and then the frequency f of the inverter 15 is set in accordance with the set value in the table 2 at a step $S_{43}$. More specifically, since the control is delayed in the multistage step control when the temperature H of the main shaft 1a rises in reference to time above a predetermined rate of change $\Delta H_o$, it is determined that it is necessary to previously increase cooling capacity of the refrigeration unit 7, and the output frequency f of the inverter 15 is increased from the control value of the above-stated multistage control. On the other hand, when the main shaft temperature H falls in reference to time above a predetermined rate of change $-\Delta H_o$, the inverter frequency f is decreased by a predetermined value so as to promptly reduce the cooling capacity.

When the control in accordance with the external signal is completed, it is determined whether or not $f \leq 120$ Hz and whether or not $f < 30$ Hz at steps $S_{44}$ and $S_{45}$, respectively. When both are YES, it is determined that the temperature difference $\Delta T$ reaches the temperature region in which the operation of the compressor 8 is to be stopped and the number of times of the determination m is counted at a step $S_{46}$. Then, it is determined whether or not the number m is below 3 at a step $S_{47}$. When the number m is 3 or less, the frequency f of the inverter 15 is forcedly maintained at 30 Hz to avoid the stoppage of the compressor 8, but when it is determined that it reaches the region in which the operation is to be stopped more than 3 times at the steps $S_{44}$ and $S_{45}$ after several repetition of controls, the compressor 8 is stopped. On the other hand, it is determined that $f < 120$ Hz, that is, the frequency f is higher than 120 Hz at the step $S_{44}$, it is considered that the frequency f is too high and the frequency f is set at 120 Hz at a step $S_{49}$. When it is determined that the frequency f is not less than 30 at the step $S_{49}$, frequency f is maintained as it is at a step $S_{50}$.

Finally, the output frequency f of the inverter 15 set by the above control is output to the compressor 8 at a step $S_{51}$ and a sampling time of 60 seconds is counted at a step $S_{53}$ and then the control of the FF mode operation is completed. The return of the control starts at the step $S_{13}$.

Figure 6A:
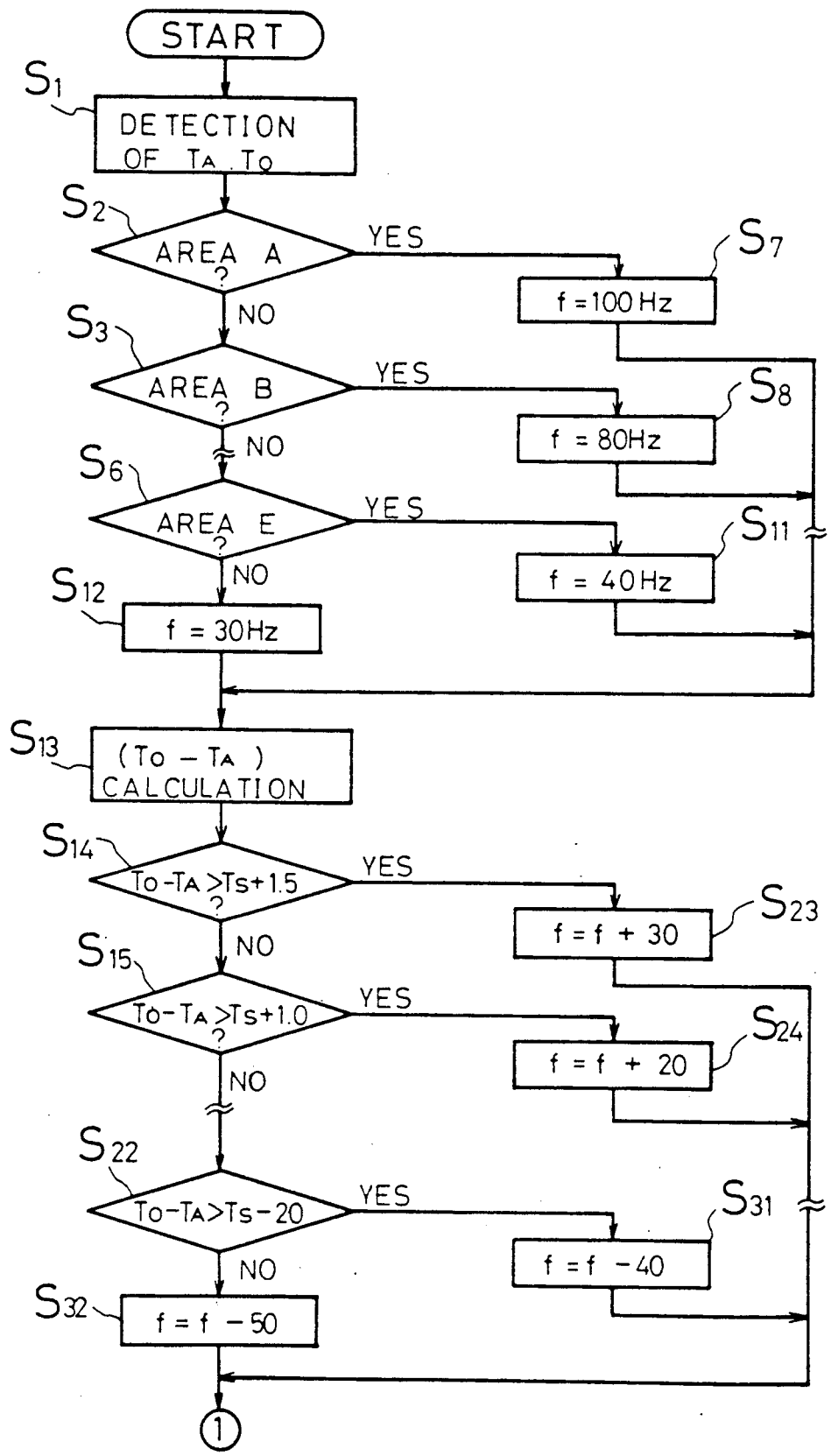
FIGS. 6a, 6b and 6c are flowcharts showing control contents of an FF mode operation.
Figure 6B:
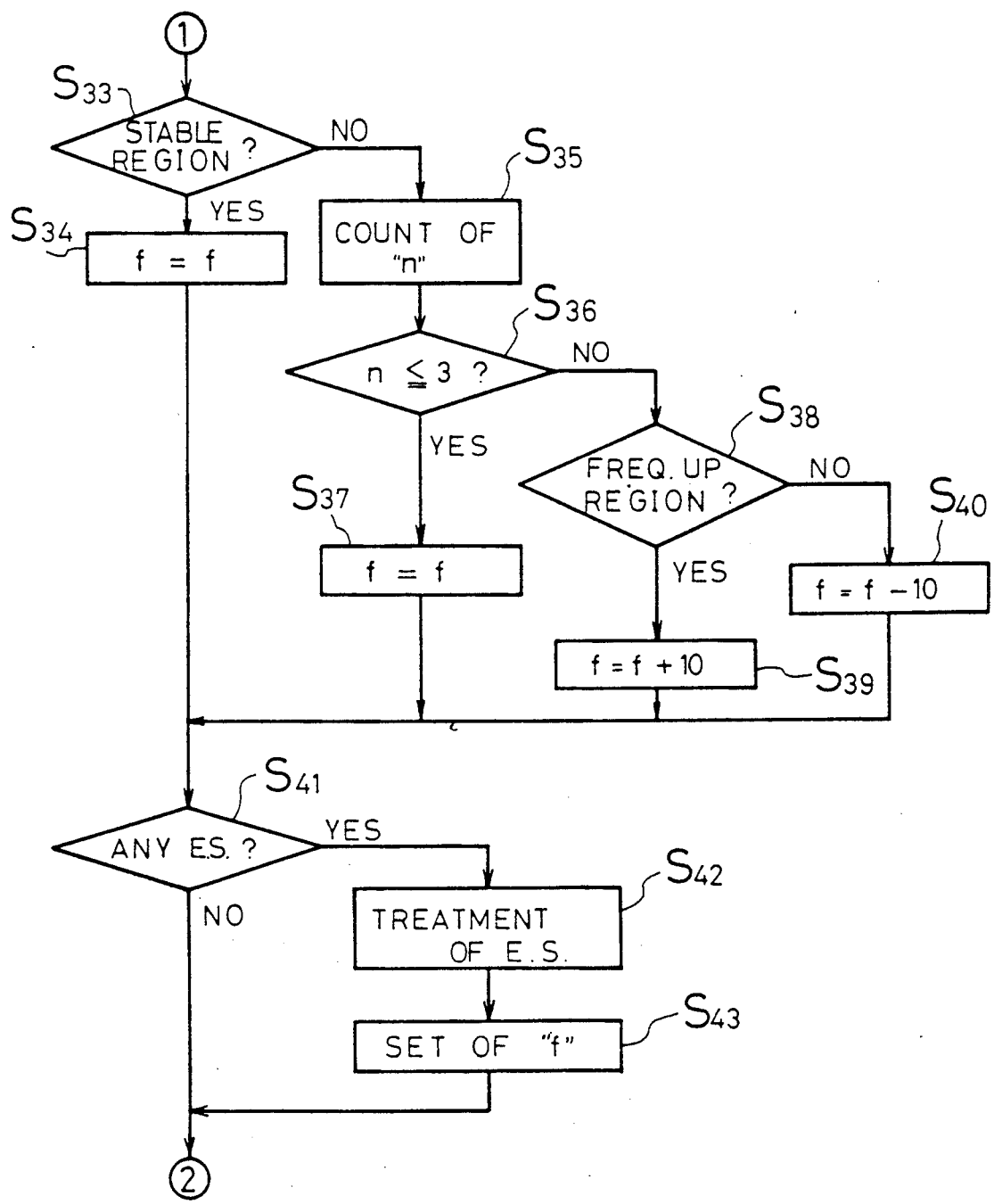
Figure 6C:
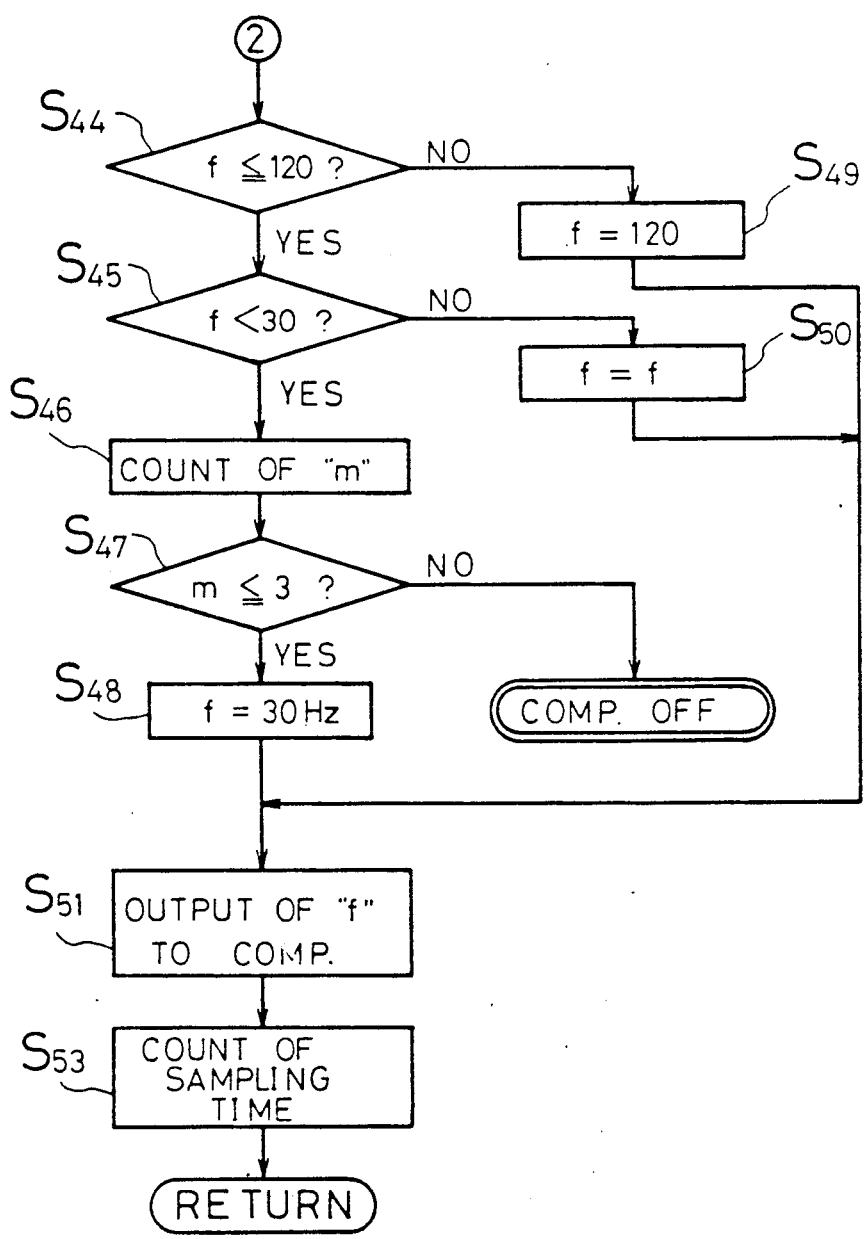
Figure 7A:
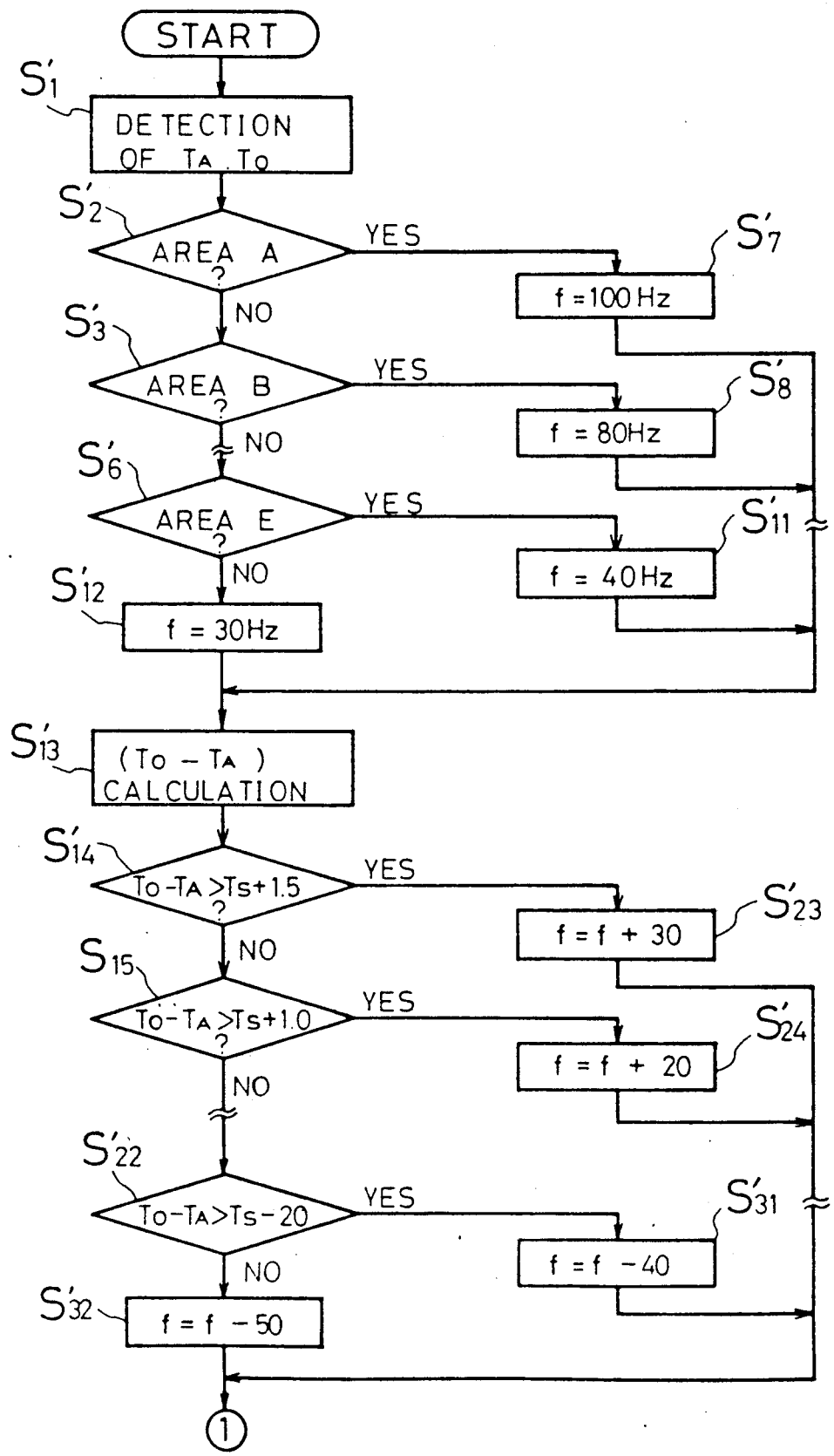
Figure 7C:
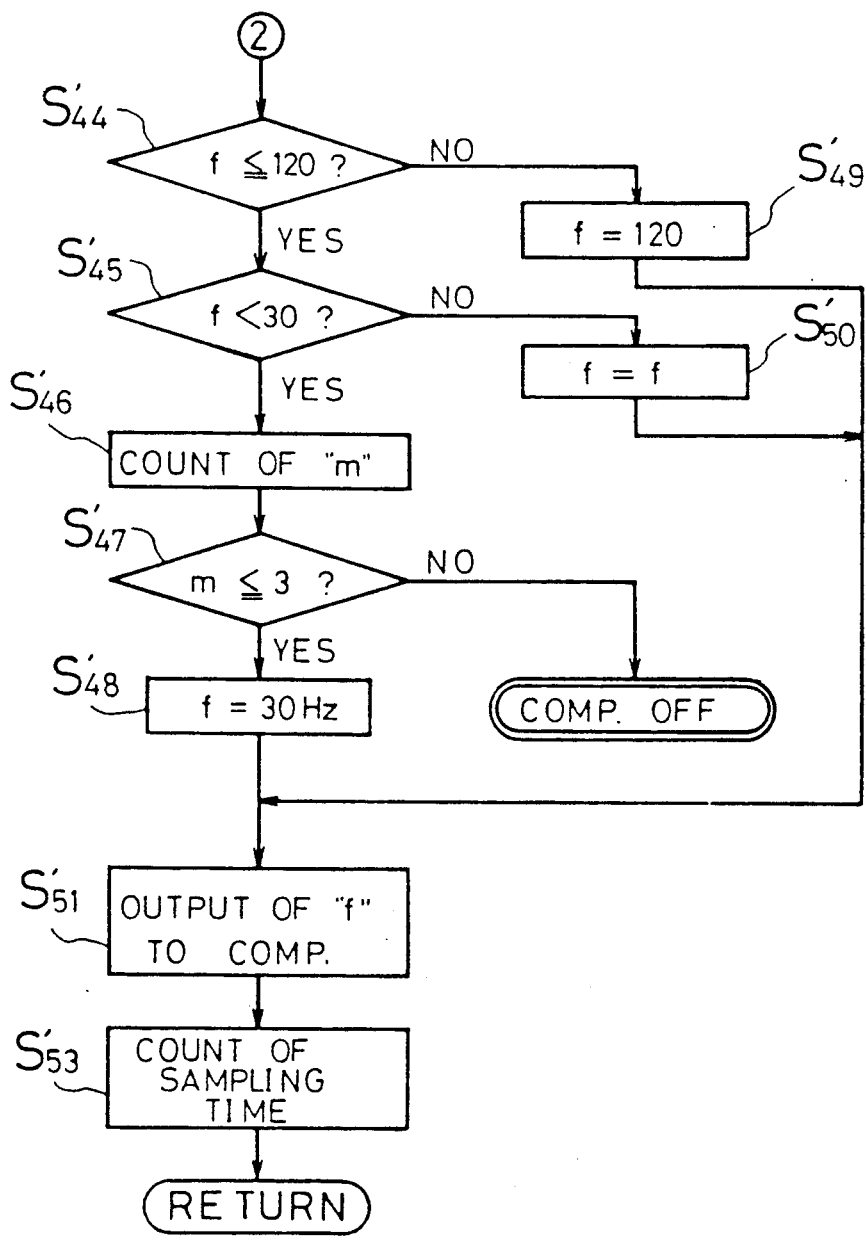

In addition, the control of the FB mode operation at steps $S_1'$ through $S_{53}'$ shown in FIGS. 7a through 7c almost correspond to the control contents of the FF mode operation in FIGS. 6a through 6c. More specifically, the inverter frequency f is controlled by a part except for the steps $S_{41}$ through $S_{43}$ in FIG. 6b, that is, the steps $S_1'$ through $S_{40}'$ and steps $S_{44}'$ through $S_{53}'$ having the same contents as those of the steps $S_1$ through $S_{40}$ and the steps $S_{44}$ through $S_{53}$.

Next, a description is given of the IF control in accordance with a flowchart in FIG. 8. It is determined whether there is a external command signal at a step $P_1$ and when the external command signal is output, the output frequency f of the inverter is set in accordance with the above table 2 at a step $P_2$. Then, it is determined whether or not the command to stop the compressor 8 is output at a step $P_3$ and when the stoppage command is not output, the flow returns to the step $R_2$ in FIG. 5 after the lapse of 30 seconds at a step $P_5$. On the other hand, when it is determined that the external command signal is not output at the step $P_1$ and that the command to stop the compressor 8 is output at the step $P_3$, the operation of the compressor 8 is stopped at a step $P_4$ and then 30 seconds pass at the step $P_5$.

Figure 9A:
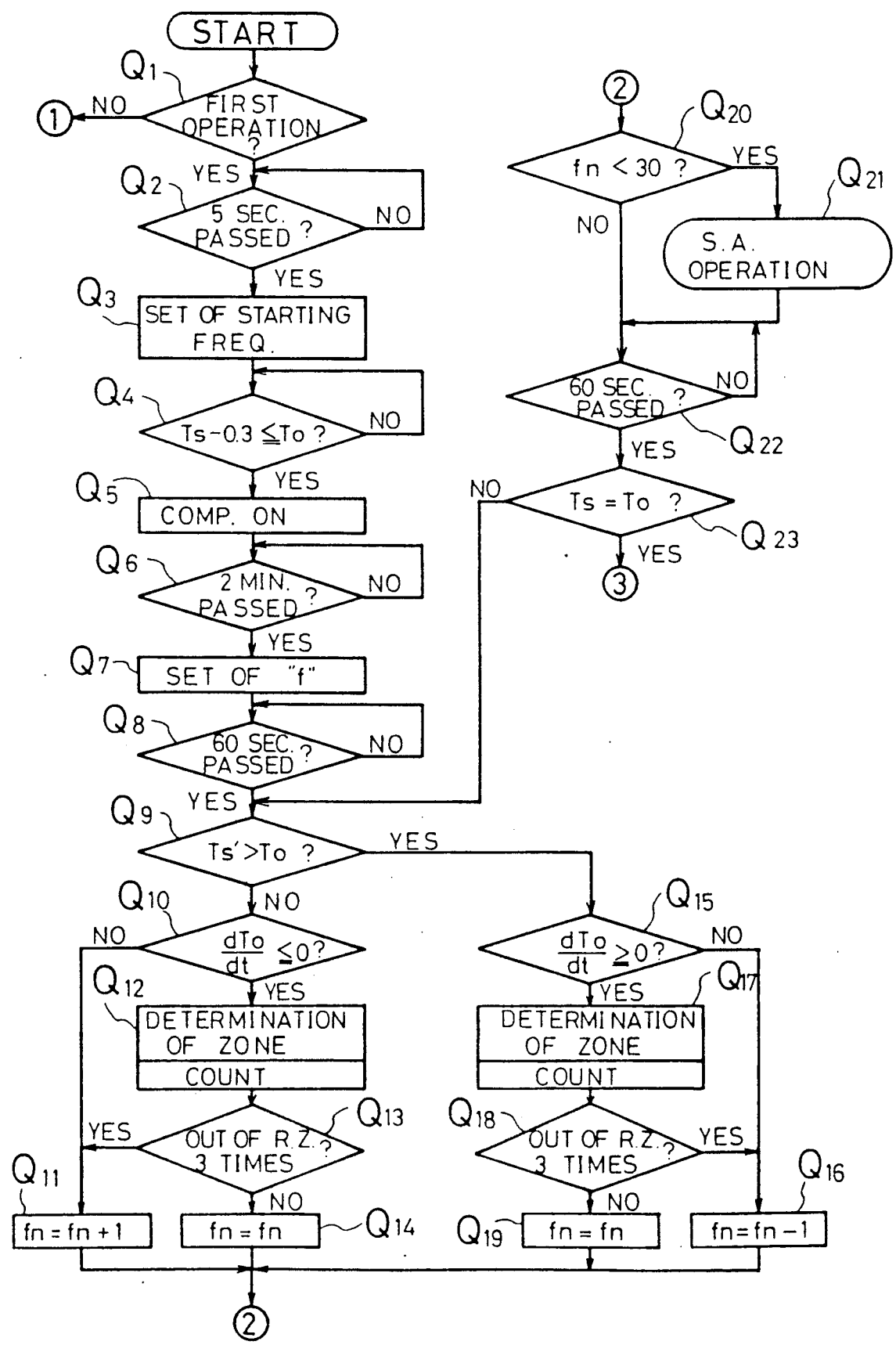
FIGS. 9a and 9b are flowcharts showing control contents by the FF mode when controlled so as to converge the temperature of coolant on a set value.
Figure 9B:
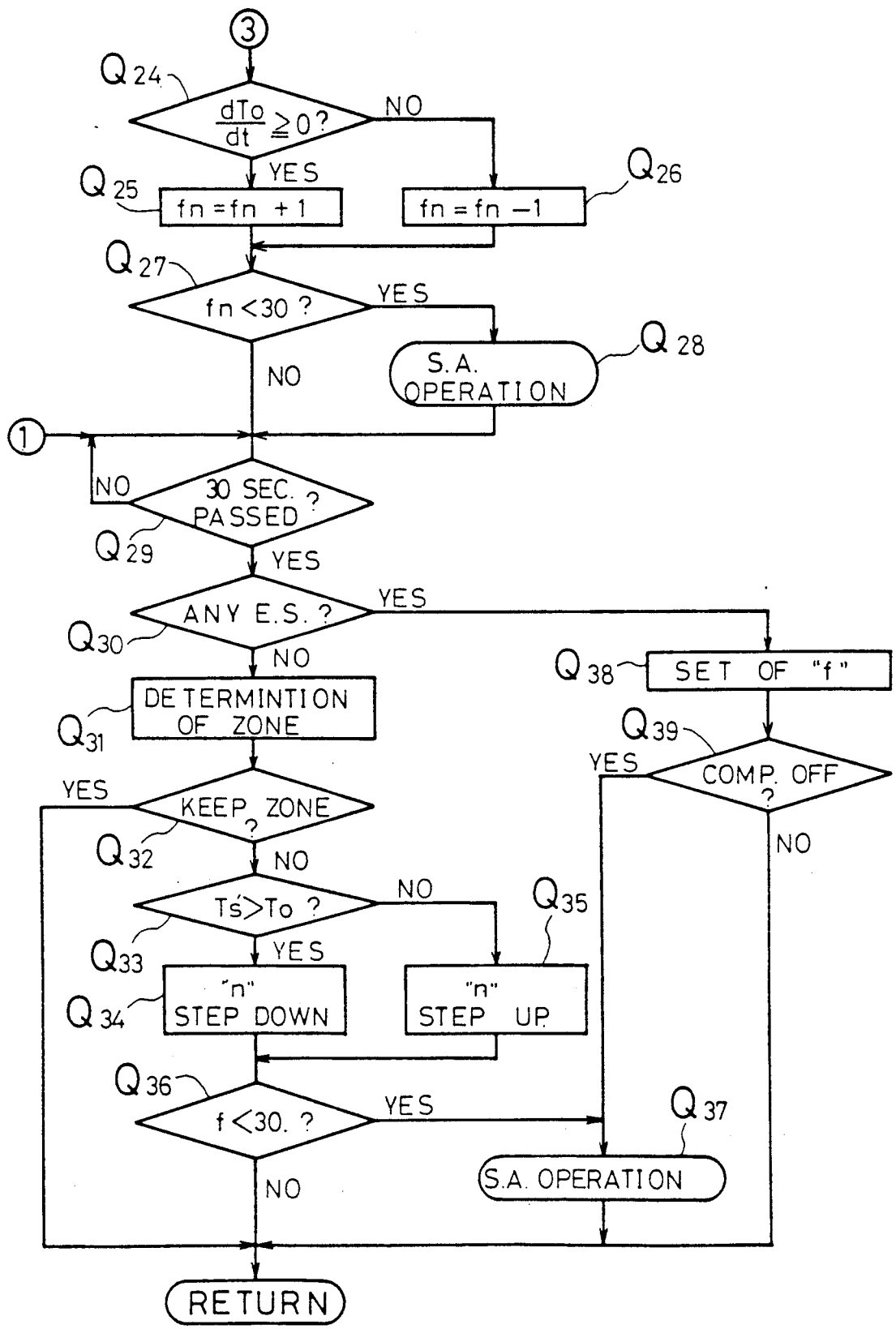

Next, a description is given of a second embodiment in reference to a flowchart in FIGS. 9a and 9b. In this embodiment, a description is given of the IF mode for performing the feedback-control such that the liquid temperature $T_O$ may converge on a set value $T_S'$ regardless of the room temperature, while changing the operating frequency f of the compressor from the control value by the feedback control when the operating condition of the machine is changed. When the oil conditioner starts its operation, it is determined whether or not the operation is for the first time at a step $Q_1$. When it is the first time, the control after a step $Q_2$ is performed and when it is not the first time, the control after a step $Q_{29}$ is performed. More specifically, 5 seconds pass at the step $Q_2$, a starting frequency of the compressor 8 is set at a step $Q_3$ and when the inlet oil temperature $T_o$ becomes the value reduced from the set temperature $T_s'$ by 0.3° C. or more at a step $Q_4$, the compressor is started at a step $Q_5$. Then, 2 minutes pass at a step $Q_6$, the frequency f of the inverter 15 is set at a predetermined initial value fn at a step $Q_7$, 60 seconds pass at a step $Q_8$ and the inlet oil temperature $T_o$ is compared with the set temperature $T_s'$ at a step $Q_9$.

When the inlet oil temperature To is equal to the set temperature $T_s'$ or more at the step $Q_9$, it is determined whether or not a differential value $dT_o/dt$ of the inlet oil temperature in reference to time is below zero, that is, whether or not the inlet oil temperature $T_o$ is falling at a step $Q_{10}$. When it is not falling, it is considered that cooling capacity has to be increased and the operating frequency f is increased by 1 step as $fn = fn + 1$ at step $Q_{11}$. On the other hand, when the inlet oil temperature $T_o$ is falling, it is determined that in which temperature zone of (3−U) through (5−L) the value exists and it is started to count how many times this determination is made at a step $Q_{12}$. The frequency fn of the inverter 15 is maintained as it is at a step $Q_{14}$ until it is determined that it is out of a reference zone (R.Z.) three times at a step $Q_{13}$. After the above-described control is repeated, when it is determined that it is out of the reference zone three times, the operating frequency fn is increased by 1 step at a step $Q_{11}$.

On the other hand, when it is determined that the inlet oil temperature $T_o$ is less than the set temperature $T_s'$ at the step $Q_9$, control corresponding to the above steps $Q_{10}$ through $Q_{14}$ is performed at steps $Q_{15}$ through $Q_{19}$. More specifically, when the differential value $dT_o/dt$ of the inlet oil temperature $T_o$ is negative or when the differential value is zero or more and the determination that it is out of the reference zone is made three times, the frequency fn of the inverter 15 is decreased by 1 step. The frequency f is not changed in any case other than that.

When the frequency fn of the inverter 15 finishes being set as described above, it is determined whether or not the frequency fn is lower than a lower limit value 30 Hz of the frequency fn of the inverter 15 at a step $Q_{20}$. When it is lower, the stoppage avoiding (S.A.) operation of the compressor 8 which is the same as the steps $S_{47}$ and $S_{48}$ in the first embodiment is performed at a step $Q_{21}$ and then 60 seconds pass at a step $Q_{22}$. On the other hand, when it is not lower, 60 seconds pass at the step $Q_{22}$ directly after the step $Q_{20}$. Then, it is determined whether or not the inlet oil temperature $T_o$ is equal to the set temperature $T_s'$ at a step $Q_{23}$. The control at the steps $Q_9$ though $Q_{22}$ is repeated until $T_o = T_s'$ when $T_o = T_s'$, it is determined whether or not the differential value $dT_o/dt$ of the inlet oil temperature $T_o$ is below zero at a step $Q_{24}$. When $dT_o/dt \geq 0$, it is set such that $fn = fn + 1$ at a step $Q_{25}$ so as to increase cooling capacity because the temperature is rising. On the other hand, when $dT_o/dt < 0$, it is set such that $fn = fn - 1$ at a step $Q_{26}$ so as to reduce the cooling capacity because the temperature is falling.

Then, an operation which is the same as that at the steps $Q_{20}$ and $Q_{21}$ is performed at steps $Q_{27}$ and $Q_{28}$ and after 30 seconds pass at a step $Q_{29}$, it is determined whether or not an external command signal is input at a step $Q_{30}$. When the external command signal is input, control by the external command signal after a step $Q_{38}$ to be described later, is and when the external command signal is not input, the feedback control after a step $Q_{31}$ is performed.

More specifically, it is determined in which temperature zone of $(5-L)$ through $(3-U)$ the present inlet oil temperature To exists from the signal of the inlet oil thermistor Th1 at a step $Q_{31}$, and it is determined whether or not the determined temperature zone is keep zones $(0-U)$ and $(0-L)$ at a step $Q_{32}$. When it is the keep zones $(0-U)$ and $(0-L)$, control is completed. On the other hand, when it is not the keep zones $(0-U)$ and $(0-L)$ and $T_s' > T_o$, the frequency fn is decreased by n steps in accordance with the temperature zone, but when $T_s' \leq T_o$, it is increased by n steps at steps $Q_{33}$ through $Q_{35}$. Then, stoppage avoiding control of the compressor 8 which is the same as that at the steps $Q_{20}$ and $Q_{21}$ is performed at steps $Q_{36}$ and $Q_{37}$ and then finished.

On the other hand, when it is determined that the external command signal is input at the step $Q_{30}$, the frequency f is set in accordance with the external command signal value at a step $Q_{38}$. Then, it is determined whether or not the stoppage command of the compressor 8 is output at step $Q_{39}$. When it is not output, the control is completed, but when it is output, the stoppage avoiding control is performed at the step $Q_{37}$ and the control is completed.

The output frequency of the inverter 15 is controlled in accordance with a liquid temperature (or the temperature difference between the liquid temperature and co-changing temperature) by receiving the output of the thermistor Th1 (or the thermistors Th1 and Th2) at the steps $S_{14}$ through $S_{32}$ and $S_{14}'$ through $S_{32}'$ in FIGS. 6a and 7a. In addition, the operating frequency of the inverter 15 is varied by receiving the output of the main shaft thermistor Th3 at the steps $S_{43}$ in FIGS. 6b or the step $P_2$ in FIG. 8.

Although the main shaft thermistor Th3 detecting the temperature of the main shaft 1a of the machine tool 1 is provided as means for detecting the operating condition of the machine 1 in the above embodiment, a strain gauge or an amperemeter of a sensor for detecting a displacement V of the main shaft 1a or a current value I as a load of the main shaft motor (not shown) of the actuator are disposed, and from the relation between the rate of change $dV/dt$ of the displacement V or the rate of change $dI/dt$ of the current I and a predetermined value $\Delta V_o$ (for example, approximately $\Delta V_o = 0.5\%/\text{sec}$) or $\Delta I_o$ (for example, approximately $\Delta I_o = 100$ mA), $\Delta H_o$ in the table 2 is replaced with the $\Delta V_o$ or $\Delta I_o$ and the frequency f of the inverter 15 can be varied depending in which zone of the zones divided into 10 steps in the vicinity of a predetermined standard value the range of the displacement V or the current value I exists.

When the machine 1 is a machine tool 1, the frequency f of the inverter 15 can be controlled in accordance with a rotation frequency A from the relation between the rate of change $dA/dt$ and a predetermined value $\Delta A_o$ (for example, approximately $\Delta A_o = 1$ rpm) using a rotation counter for detecting the rotation frequency A of the main shaft as means for detecting the operating condition.

As a result, in the above-described embodiment, a signal concerning the operating condition of the machine tool (machine) 1 is input by the operating condition detector and the output frequency f of the inverter 15 is finely varied for adjustment by changing the frequency in accordance with the value, so that a stable control immediately corresponding to the change of condition can be carried out without generating hunting due to the considerable change of temperature.

While the feedback control is carried out such that a liquid temperature may converge on a set value, if the inverter frequency is changed from the control value by the feedback control only when the operating condition of the machine changes, the output frequency f of the inverter 15 is feedback-controlled in a multistaged manner such that the inlet oil temperature To of the cooling oil of the machine tool detected by the inlet oil thermistor Th1 may converge on the set value $T_s'$ and the operating frequency of the compressor 8 is adjusted in accordance with the value. As a result, the quantity of heat exchange between refrigerant and liquid of an evaporator 11 is adjusted so as to keep the liquid temperature constant.

At that time, while the cooling oil temperature is held constant by such feedback control, if the operating condition of the main shaft rotation frequency A of the machine tool 1, the temperature H of the main shaft 1a, the displacement V of the main shaft 1a or the like is changed and its quantity of change exceeds the set value, it is not possible to immediately follow it with the adjustment of the frequency f of the inverter 15 by the feedback control only, so that a control delay or an unstable control condition could be generated. In the above-described embodiment, however, when such things happen, the inverter frequency by the feedback control means is changed for adjustment in accordance with the operating condition by changing the frequency according to the change of the operating condition detected by the operating condition detecting means. As a result, the control delay due to the feedback control is not caused and it is possible to follow the change of the operating condition immediately, so that a control precision can be improved while hunting is prevented effectively.

When the room temperature $T_A$ to which the liquid temperature To is co-changed is detected by the room temperature thermistor Th2 and the same control as above is performed on the temperature difference $\Delta T$ ($T_o - T_A$) between the cooling oil temperature $T_o$ and the room temperature $T_A$ instead of the cooling oil temperature $T_o$, even if the room temperature $T_A$ is changed, the temperature difference between the liquid temperature and the room temperature is held within an appropriate range in accordance with the change. Therefore, a temperature control precision can be improved, following the change of the temperature of an co-changing object such as room air, that is, the change of atmosphere. In addition, in this case, the co-changing object is not limited to the room air and for example, the temperature of the machine tool 1 and the like may be used as the object.

When the feedback control in accordance with the normal inlet oil thermistor Th1, the frequency changing control and the control switching the feedback control and the frequency changing control are alternatively selected in an by the mode switches SW1 through SW3, it is possible to control the operation of the oil conditioner (cooling system) 2 at a preferable control mode in accordance with the kind of machine, the kind of work in the machine tool 1 or the like.

The same is true in the case where the feedback control by the feedback controlling means in accordance with the temperature difference ($T_o - T_A$) between the inlet oil temperature $T_o$ and the room temperature $T_A$, the control by frequency changing means and the control switching the feedback control and the frequency changing control are alternatively selected by the mode switch SW1 through SW3.

When the main shaft thermistor Th3 in the above embodiment is used as means for detecting the operating condition of the machine 1, the following effect can be obtained. That is, when the temperature of the machine 1 rises for some reason, there is usually a certain time delay until the temperature of the coolant is changed by the temperature rise, but in this case, since the change of the temperature of the machine 1 is promptly detected by the temperature themistor Th3 and the refrigerating capacity of the refrigeration circuit 14 is previously changed, it is possible to immediately correspond to the change of the operating condition of the machine 1.

When a sensor detecting the mechanical strain of an operating part on the machine 1 is used as means for detecting the operating condition, the strain generated by the change of applied force and the temperature of the operating part of the machine 1 is promptly detected.

When a sensor detecting a load applied to the actuator of the machine 1 is used as means for detecting the operating condition, it is possible to know in advance the generation of the change of temperature, strain or the like in the operating part by an increase in the load of the machine 1.

Similarly, when a sensor detecting the rotation frequency of the main shaft in the case where the machine is a machine tool, it is possible to know in advance the change of temperature or strain by the change of the rotation frequency of the main shaft.

Although the mode switches SW1 through SW3 operating as means for selecting a control mode, are switched by hand in the above embodiment, selection signals of the mode switches SW1 through SW3 may be programmed and the control may be selected by that signal when the changing pattern of the control mode has been already decided from an operation schedule of the machine tool 1 and the like.

In that case, also when as an output external command signal in accordance with the operating condition of the machine 1, the change of the operating condition such as a rotation frequency of the machine tool has been known from an operating pattern, a 4-bit signal in accordance with the table 2 can be directly input to the interface circuit 16b by having programmed a signal output timing into the interface circuit 16b.

Figure 10:
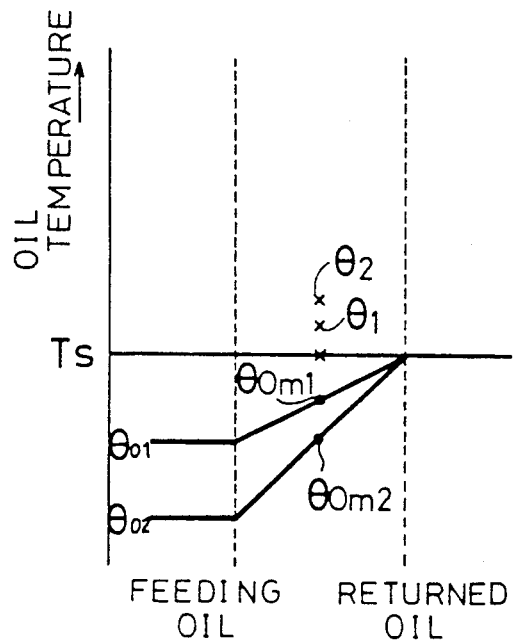
FIG. 10 is a characteristic view showing the change of the temperature of cooling oil when a returned liquid from a machine is held constant.

When the thermistor Th1 operating as means for detecting the coolant temperature, is provided at the inlet of the oil conditioner 2 for cooling oil as in the above embodiment, these especially is an effect that the influence of the control temperature on the fluctuation of the heat due to the working and the like of the machine tool 1 can be restrained. When the heat on the machine tool 1 side is changed, an average temperature $\theta$ of a returned oil and a feeding oil is lowered due to an increase in the heat Q, so that the quantity of the change of component temperature $\theta$ is offset by this lowered quantity. For example, as shown in FIG. 10, the component temperature $\theta$ is raised to a temperature $\theta$ higher by the constant ratio corresponding to heat capacity in accordance with the average temperature of the return oil temperature and the feeding oil temperature. Therefore, when the heat Q of the machine tool 1 is increased from $Q_1$ to $Q_2$ ($Q_1 < Q_2$), the component temperature $\theta$ is accordingly increased from $\theta_1$ to $\theta_2$. At this time, as shown in FIG. 10, the change from $\theta_1$ to $\theta_2$ of the component temperature $\theta$ is restrained to be small by changing the average temperature $\theta_o$ such that $\theta_{om1} < \theta_{om2}$, that is, it may be lowered.

Figure 11:
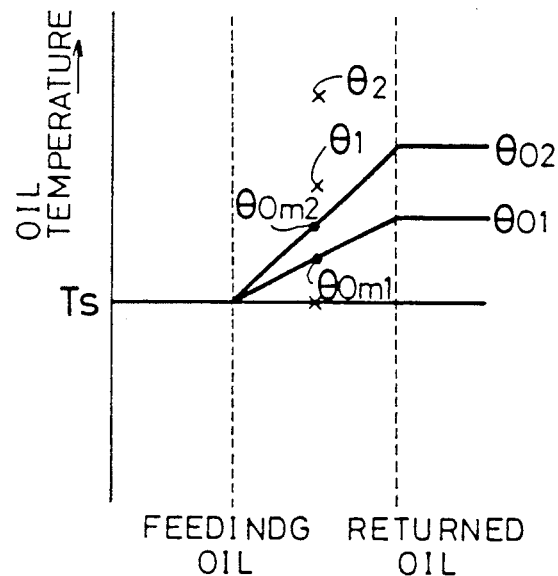
FIG. 11 is a characteristic view showing the change of the temperature of cooling oil when a feeding liquid to a machine is held constant.
Figure 12:
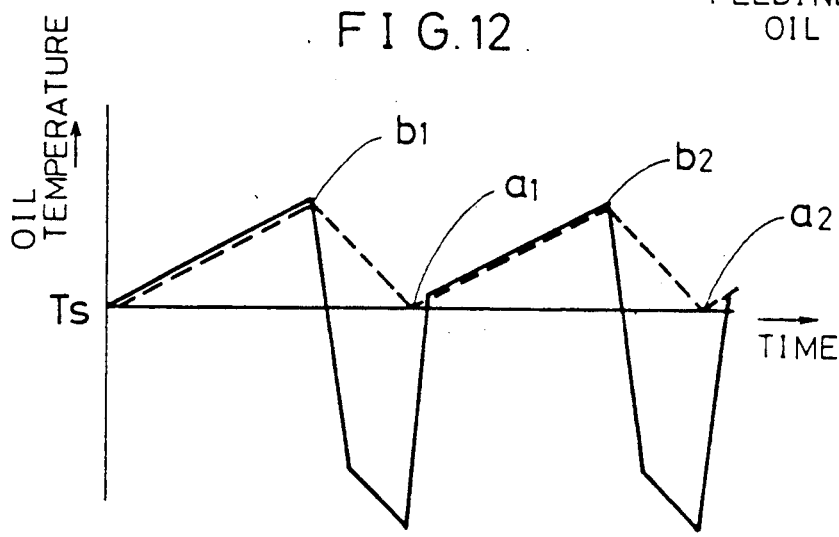
FIG. 12 is a characteristic view showing the change of the temperature of cooling oil when the temperature of coolant is controlled by ON . OFF operation of the compressor.

Therefore, as shown in FIG. 11, it is possible to improve a temperature control precision without enlarging the temperature difference due to an increase in the heat Q of the machine tool 1.

It is the same when the operating frequency of the compressor 8 is controlled such that the temperature difference $\Delta T$ between the inlet oil temperature $T_o$ and the room temperature $T_A$ may converge on the set value Ts.

In addition, since the stable region control was carried out at the steps $S_{33}$ through $S_{40}$ in FIG. 6b and the change of the temperature condition is carefully determined by sampling three times until the change of the operating frequency of the compressor 8 in the above embodiment, the temperature is prevented from changing frequently for a short time and stable control can be performed.

The operating frequency f of the compressor 8 is forcedly controlled in accordance with the input of an external signal regardless of the signal of the thermistors Th1 and Th2 at the steps $S_{40}$ through $S_{43}$, so that the control can be carried out corresponding to the change of an important external condition, such as the change of the temperature of the main shaft 1a of the machine tool 1.

In addition, as shown at the steps $S_{44}$ through $S_{50}$ or the steps $Q_{21}$, $Q_{28}$ and $Q_{37}$, there is provided a predetermined limit value at the operating frequency and no operation is performed above that limit value. Also, even when the command operating frequency is below the lowest controllable value, the operation is not stopped until determination is made by sampling three times. As a result, since the operating condition could recover for that time, the operation stoppage can be avoided as much as possible. Therefore, a trouble of the compressor due to frequent ON. OFF operation can be prevented. Consequently, the reliability of the compressor is improved. In addition, although its embodiment is dispensed with, as can be easily understood, the same effect can be obtained also in the case where the compressor is stopped when the stoppage command signal of the compressor is output over a predetermined time.

In addition, the machine 1 to be cooled in the present invention is not limited to the machine tool in the above embodiment and it can be applied to other kinds of industrial machines.

Although oil is used as coolant in the above embodiment, the same effect can be obtained with other kinds of liquid such as water. The present invention can be applied not only to processing machines such as a lathe, a grinding machine, a press machine and an injection machine for plastic, but also to a cooling system for cooling coolant or lubricant in a machine having a heating part such as a general industrial machine used in a production line.

What is claimed is:

1. A temperature controller of a liquid cooling system having a liquid circulation circuit and a refrigeration circuit, said liquid circulation circuit circulating coolant in a machine having an operating part for generating heat, and said refrigeration circuit having a compressor, a condensor, a reducing valve and an evaporator for cooling said coolant in said liquid circulation circuit by a heat exchange with refrigerant and sequentially connecting these with a refrigerant tube, said temperature controller comprising:

inverter means for variable adjusting the operating frequency of said compressor;
   means for detecting a temperature of said coolant in said liquid circulation circuit;
   means, connected to said means for detecting a temperature of said coolant, for feedback-controlling a frequency of said inverter such that said temperature of said coolant converges to a predetermined set value;
   means for detecting an operating condition relevant to a quantity of heat generated in said machine;
   means, connected to said means for detecting an operating condition, for varying said frequency value determined by said feedback-controlling means by a quantity corresponding to a change of said operating condition of said machine when said change of said operating condition of said machine is greater than a predetermined value;
   means, connected to said means for detecting a temperature of said coolant, for outputting a stoppage command signal for stopping operation of said compressor when said temperature of said coolant is within a previously set range; and
   means, connected to said means for outputting the stoppage command signal, for stopping said compressor when said stoppage command signal is output a predetermined number of time in succession.

2. A temperature controller of a liquid cooling system having a liquid circulation circuit and a refrigeration circuit, said liquid circulation circuit circulating coolant in a machine having an operating part for generating heat, and said refrigeration circuit having a compressor, a condenser, a reducing valve and an evaporator for cooling said coolant in said liquid circulation circuit by a heat exchange with refrigerant and sequentially connecting these with a refrigerant tube, said temperature controller comprising:

inverter means for variably adjusting the operating frequency of said compressor;
   means for detecting a temperature of said coolant in said liquid circulation circuit;
   means for detecting a temperature of a co-changing object to which said temperature of said coolant is to be co-changed;
   means, connected to said means for detecting a temperature of said coolant and said means for detecting a temperature of a co-changing object, for feedback-controlling a frequency of said inverter means such that a temperature difference between said temperature of said coolant and said temperature of said co-changing object converges to a predetermined set value;
   means for detecting an operating condition relevant to a quantity of heat generated in said machine;
   means, connected to said means for detecting an operating condition, for varying a frequency of said inverter from a frequency value determined by said feedback-controlling means by a quantity corresponding to a change of said operating condition of said machine when said change of said operating condition of said machine is greater than a predetermined value;
   means, connected to said means for detecting a temperature of said coolant and to said means for detecting a temperature of a co-changing object, for outputting a stoppage command signal for stopping operation of said compressor when a temperature difference between said temperature of said coolant and said temperature of said co-changing object is within a previously set range; and
   means, connected to said means for outputting a stoppage command signal, for stopping said compressor when said stoppage command signal is output a predetermined number of times in succession.

3. A temperature controller of a liquid cooling system in accordance with claim 2, wherein said temperature of said co-changing object corresponds to a room temperature.

4. A temperature controller of a liquid cooling system in accordance with claim 2, wherein the co-changing object comprises an operating part of said machine.

5. A temperature controller of a liquid cooling system having a liquid circulation circuit and a refrigeration circuit, said liquid circulation circuit circulating coolant in a machine having an operating part for generating heat, and said refrigeration circuit having a compressor, a condenser, a reducing valve and an evaporator for cooling said coolant in said liquid circulation circuit by a heat exchange with refrigerant and sequentially connecting these with a refrigerant tube, said temperature controller comprising:

inverter means for variably adjusting the operating frequency of said compressor;
   means for detecting a temperature of said coolant in said liquid circulation circuit;
   means, connected to said means for detecting a temperature of said coolant, for feedback-controlling a frequency of said inverter such that said temperature of said coolant converges to a predetermined set value;

means for detecting an operating condition relevant to a quantity of heat generated in said machine;

means, connected to said means for detecting an operation condition, for varying said frequency of said inverter in accordance with a change of said operating condition of said machine; and means, connected to said means for detecting a temperature of said coolant and to said means for detecting an operating condition of said machine, for selecting one of a plurality of control modes for controlling the frequency of said inverter means in accordance with an external command signal, said plurality of control modes including a first control mode utilizing only said means for feedback-controlling, a second control mode utilizing said means for feedback-controlling and varying said frequency of said inverter means from a frequency value determined by said means for feedback-controlling by a quantity corresponding to a change of said operating condition of said machine when said change of said operating condition of said machine is greater than a predetermined value, and a third control mode utilizing only said means for varying a frequency of said inverter means in accordance with a change of said operating condition of said machine.

6. A temperature controller of a liquid cooling system in accordance with claim 5, comprising:

means, connected to said means for detecting a temperature of said coolant, for outputting a stoppage command signal for stopping operation of said compressor when said temperature of said coolant is within a previously set range; and means, connected to said means for outputting a stoppage command signal, for stopping said compressor when said stoppage command signal is output for a predetermined time period.

7. A temperature controller of a liquid cooling system in accordance with claim 5, wherein said means for detecting an operating condition of said machine comprises a sensor for detecting a rotation frequency of a main shaft of a machine tool.

8. A temperature controller of a liquid cooling system in accordance with claim 5, wherein said means for detecting an operating condition of said machine comprises a sensor for detecting a temperature of an operating part of said machine.

9. A temperature controller of a liquid cooling system in accordance with claim 5, wherein said means for detecting an operating condition of said machine comprises a sensor for detecting a mechanical strain of an operating part of said machine.

10. A temperature controller of a liquid cooling system in accordance with claim 5, wherein said means for detecting an operating condition of said machine comprises a sensor for detecting a power load of said machine.

11. A temperature controller of a liquid cooling system in accordance with claim 5, wherein said means for detecting a temperature of said coolant detects coolant returned from said machine.

12. A temperature controller of a liquid cooling system having a liquid circulation circuit and a refrigeration circuit, said liquid circulation circuit circulating coolant in a machine having an operating part for generating heat, and said refrigeration circuit having a compressor, a condenser, a reducing valve and an evaporator for cooling said coolant in said liquid circulation circuit by a heat exchange with refrigerant and sequentially connecting these with a refrigerant tube, said temperature controller comprising:

inverter means for variably adjusting the operating frequency of said compressor;

means for detecting a temperature of said coolant in said liquid circulation circuit;

means for detecting a temperature of a co-changing object to which said temperature of said coolant is to be co-changed;

means, connected to said means for detecting a temperature of said coolant and to said means for detecting a temperature of a co-changing object, for feedback-controlling said frequency of said inverter such that a temperature difference between said temperature of said coolant and said temperature of said co-changing object converges to a predetermined set value;

means for detecting an operating condition relevant to a quantity of heat generated in said machine;

means, connected to said means for detecting an operating condition, for varying said frequency of said inverter in accordance with a change of said operating condition of said machine; and means, connected to said means for detecting a temperature of said coolant and to said means for detecting an operating condition of said machine, for selecting one of a plurality of control modes for controlling the frequency of said inverter means in accordance with an external command signal, said plurality of control modes including a first control mode utilizing only said means for feedback-controlling, a second control mode utilizing said means for feedback-controlling and varying said frequency of said inverter means from a frequency value determined by said means for feedback-controlling by a quantity corresponding to a change of said operating condition of said machine when said change of said operating condition of said machine is greater than a predetermined value, and a third control mode utilizing only said means for varying a frequency of said inverter means in accordance with a change of said operating condition of said machine.

* * * * *